United States Patent [19]

Zaguskin et al.

[11] Patent Number: 5,735,041
[45] Date of Patent: Apr. 7, 1998

[54] WIRE HARNESS ASSEMBLY ON TRIM PANEL

[75] Inventors: Alex Zaguskin, Farmington Hills; Jeffrey A. Branch, Eastpointe, both of Mich.

[73] Assignee: United Technologies Automotive, Inc., Dearborn, Mich.

[21] Appl. No.: 722,376

[22] Filed: Sep. 30, 1996

Related U.S. Application Data

[63] Continuation-in-part of Ser. No. 687,133, Jul. 24, 1996.

[51] Int. Cl.$^6$ .................................................. H01R 33/00
[52] U.S. Cl. .................................................. 29/857; 439/34
[58] Field of Search ...................... 29/857, 854, 33 M; 439/34; 296/146.7

[56] References Cited

U.S. PATENT DOCUMENTS

| | | | |
|---|---|---|---|
| 4,848,829 | 7/1989 | Kidd | 439/34 X |
| 4,882,842 | 11/1989 | Basson et al. | 29/857 |
| 4,907,836 | 3/1990 | Ueda et al. | 296/146.7 X |
| 5,083,369 | 1/1992 | Cerda | 29/857 |
| 5,092,647 | 3/1992 | Ueda et al. | 296/146.7 |
| 5,097,592 | 3/1992 | Schultz, Jr. et al. | 439/34 X |
| 5,251,403 | 10/1993 | Compeau et al. | 49/502 |
| 5,297,334 | 3/1994 | Johnson | 29/861 |
| 5,309,634 | 5/1994 | Van Order et al. | 29/863 |
| 5,367,832 | 11/1994 | Compeau et al. | 49/502 |
| 5,385,481 | 1/1995 | Kotyuk | 439/378 |
| 5,425,206 | 6/1995 | Compeau et al. | 49/502 |
| 5,460,530 | 10/1995 | Toba et al. | 439/34 |
| 5,501,605 | 3/1996 | Ozaki et al. | 439/34 |

FOREIGN PATENT DOCUMENTS

| 19532664 | 7/1996 | Germany . |
|---|---|---|

*Primary Examiner*—James F. Coan
*Attorney, Agent, or Firm*—Howard & Howard

[57] ABSTRACT

A vehicle includes a frame having an inner surface and a trim panel having an outer surface adapted to overlie the inner surface of the frame. A plurality of electrical devices are secured in the frame and the trim panel for carrying out various tasks and operations. A plurality of electrical wires are secured to the outer surface of the trim panel and electrically connect to the several electrical devices. Wire routing elements extend from the outer surface of the trim panel for individually and sequentially securing the plurality of electrical wires on the outer surface of the trim panel to eliminate the need for a prefabricated wiring harness. In a preferred embodiment, the routing element comprises opposed retainers. The opposed retainers ensure the wire is securely held on the trim panel. The routing elements may alternatively comprise a series of L-shaped posts between which the electrical wires are woven, a series of tabs having a V-shaped receiving notch into which the wires are seated, channels along which the electrical wires are secured by glue, or self-locking strap-like clamps for clamping the electrical wires to the trim panel. The individual electrical wires are routed directly, so that a separate wire harness is eliminated. Also, the subject method eliminates one step on the automobile assembly line process, namely the attachment of the prior art wiring harness to the door frame or to the trim panel.

6 Claims, 3 Drawing Sheets

WIRE HARNESS ASSEMBLY ON TRIM PANEL

This application is a continuation-in-part of U.S. patent application Ser. No. 08/687,133 which was filed Jul. 24, 1996.

BACKGROUND OF THE INVENTION

The subject invention relates to a method and trim panel construction for routing and retaining electrical wires in a vehicle trim panel.

One example of the invention may be used in a vehicle door panel. An automobile door frequently houses numerous electrical components and devices for carrying out various tasks and operations. For example, the door may include an electric motor for controlling up and down movements of a window, an electric solenoid for controlling a door lock, an electric motor for controlling a side view mirror, an electronic switching module (i.e., a mux box), loud speakers, lights, and controlling features such as power window switches, a power lock switch, power seat control switches, and the like. A plurality of electrical wires are routed within the door for connecting the various electrical components to each other, to other complimentary features, and to a source of electricity.

In the known art, the electrical wires are pre-assembled into a wiring harness. Because the prior art wiring harnesses are pre-assembled and shipped to the assembly line for installation at the time of assembly of the automobile, it is necessary to create inventory for the wiring harnesses. In addition, the connection of wire harness to both the trim panel and the vehicle is complicated and difficult.

SUMMARY OF THE INVENTION

An inventive method for assembling an electrical wire covering trim panel to a structural frame of a vehicle comprises the steps of: forming a structural frame having an inner surface; forming a trim panel having an outer surface adapted to overlie the inner surface of the frame; positioning a plurality of electrical devices in the door frame and the trim panel; forming wire routing elements on the outer surface of the trim panel; individually and sequentially securing a plurality of electrical wires along the routing elements to the electrical devices to eliminate the need for a prefabricated wiring harness; and attaching the outer surface of the trim panel to the inner surface of the frame.

The invention also includes a vehicle frame and trim assembly including a plurality of internal electrical wires. The assembly comprises: a structural frame having an inner surface; a trim panel having an outer surface adapted to overlie the inner surface of the frame; a plurality of electrical devices secured in the frame and the trim panel; a plurality of electrical wires secured to the outer surface of the trim panel and electrically connected to the electrical devices; and wire routing elements extending from the outer surface of the trim panel for individually and sequentially securing the plurality of electrical wires to eliminate the need for a prefabricated wiring harness.

The subject invention overcomes the disadvantages of the prior art by eliminating the wiring harness prefabrication process entirely. Instead, the individual electrical wires are routed directly on the outer surface of the trim panel, such that there is no inventory, cataloging or shipment concerns apart for the trim panel itself. Also, the subject method eliminates one step on the assembly line, namely the separate attachment of a wiring harness to the frame or to the trim panel.

In a preferred embodiment, the wire routing elements are a pair of opposed retainers which are molted integrally with the trim panel, and which are formed about a well. The retainers are connected to one edge of the well and extend toward an opposed side of the well. The retainer is spaced from the opposed side, such that the retainer effectively provides a locking finger. The two retainers extend in opposed directions such that one of the retainers is attached to each of the two edges. The wire is initially snapped beneath one of the retainers and then is snapped beneath the other. In this way, the wire is held securely against any shaking or rocking that the trim panel may experience.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
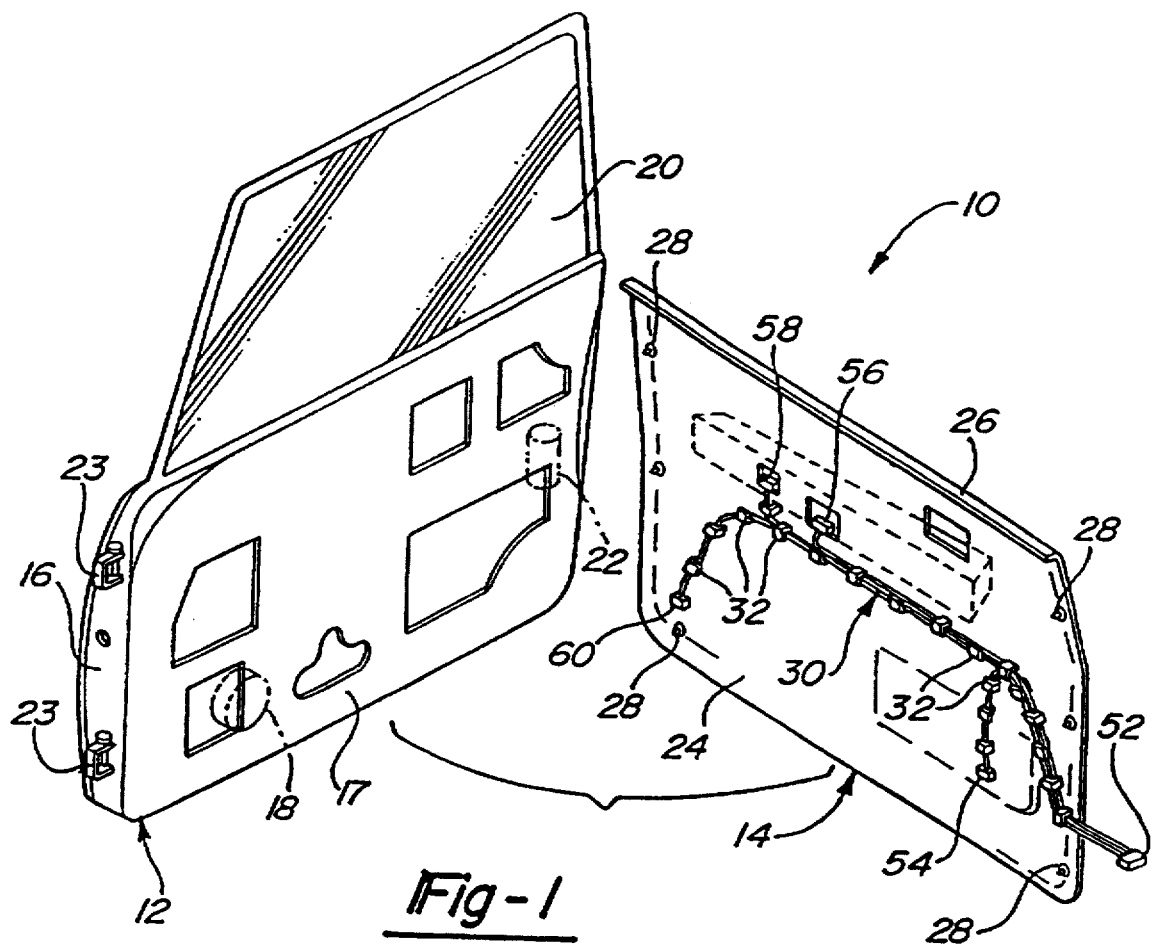
FIG. 1 is an exploded perspective view showing an automobile door frame and trim panel having a plurality of electrical wires individually and sequentially routed therein.

Referring to the Figures, wherein like numerals indicate like or corresponding parts throughout the several views, an automobile door assembly is generally shown at 10 in FIG. 1. The door assembly 10 includes a structural door frame, generally indicated at 12, and a trim panel, generally indicated at 14. The door frame 12 typically includes a hollow body 16 welded together from multiple pieces of stamped sheet metal. The inner surface of the body 16 is referenced at 17. Devices are provided inside the hollow body 16, such as an electric motor 18 for controlling up and down movements of a window 20, an electric solenoid 22 for controlling a door lock (not shown). This listing is not meant to be exhaustive. Other electrical components known to those skilled in the art, such as an electric motor for controlling a side view mirror (neither of which are shown) and perhaps an electric switching module referred to as a mux box (also not shown) may also be included. Hinges 23 are shown on the one edge of the door frame 12 for pivotally attaching the door frame 12 to the A-pillar (or B-pillar or other portion of the automobile body) of the automobile.

The trim panel 14 includes an outer surface 24 which is adapted to overlie the body 16 of the door frame 12, and an interior surface 26 presented toward and visible to the passenger compartment of the automobile. The interior surface 26 of the trim panel 14 will usually include electrical components in the form of controlling features such as power window switches, a power lock switch, power seat control switches, and the like. The trim panel 14 may also include loud speakers and lighting features (not shown). At the time of assembly of the automobile, the trim panel 14 is attached to the body 16 of the door frame 12 such as by self-locking push retainers 28.

A plurality of electrical wires, generally indicated at 30 in FIGS. 1–4, are secured to the outer surface 24 of the trim panel 14 for electrically connecting the various electrical devices to each other and to a source of electricity. Whereas the prior art has exclusively taught that the electrical wires are to be prefabricated into a harness assembly to facilitate installation, connection and protection of the individual wires, the electrical wires 30 of the subject invention are independently and sequentially routed between their respective origination and destination points directly on the outer surface 24 of the trim panel 14. In this manner, the entire prefabrication step can be avoided, thereby conserving time investments, as well as reducing the inventory, cataloging and shipping concerns raised by the prior art wiring harness assemblies.

To facilitate this procedure, wire routing elements are formed on the outer surface 24 of the trim panel 14 for individually and sequentially securing the electrical wires 30 therealong. One possible construction of the routing elements comprises L-shaped posts 32 integrally formed with the trim panel 14 at the time of its molding. These L-shaped posts 32 may point in alternating directions so that the electrical wires 30 are woven or laced back and forth between the posts 32, and thereby secured in position to protect the wires from abrasion damage and from causing rattling noises. Of course, the arrangement and spacing of the posts 32 in FIG. 1 is provided for illustrative purposes only.

Figure 2:
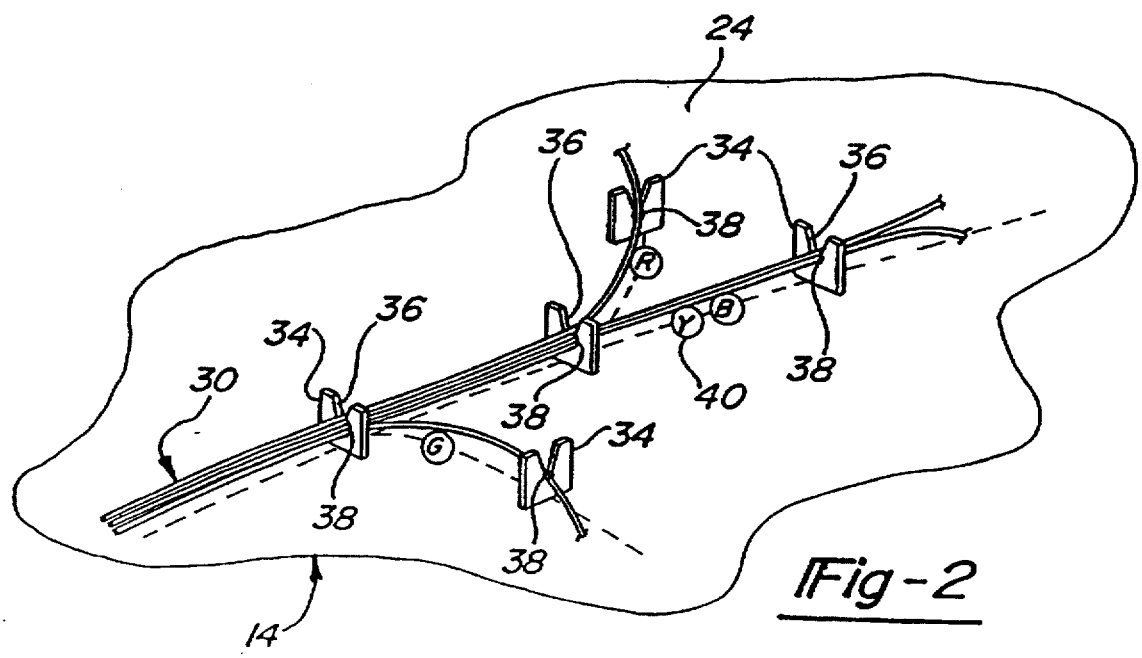
FIG. 2 is a first alternative embodiment of the routing elements extending from the outer surface of the trim panel according to the subject invention.

Referring to FIG. 2, a first alternative embodiment of the routing elements is shown, wherein the routing elements comprise tabs 34, each having a V-shaped receiving notch 36. At the base (vertex) of each receiving notch 36 is formed a pocket 38 in which the wire or wires are seated. The electrical wires 30 are routed one-at-a-time between adjacent tabs 34, with each wire being forcibly inserted into the receiving notch 36 until seated in the pocket 38 to securely retain it in its routed position. The outer surface 24 of the trim panel 14 may include printed or molded (either embossed or inset) instructional indicia 40 to assist the worker in routing the various wires between their respective origination and destination points. For example, the instructional indicia may include a dashed line and a wire color identifier. The instructional indicia may be used with any of the other embodiments of the subject invention described herein.

Figure 3:
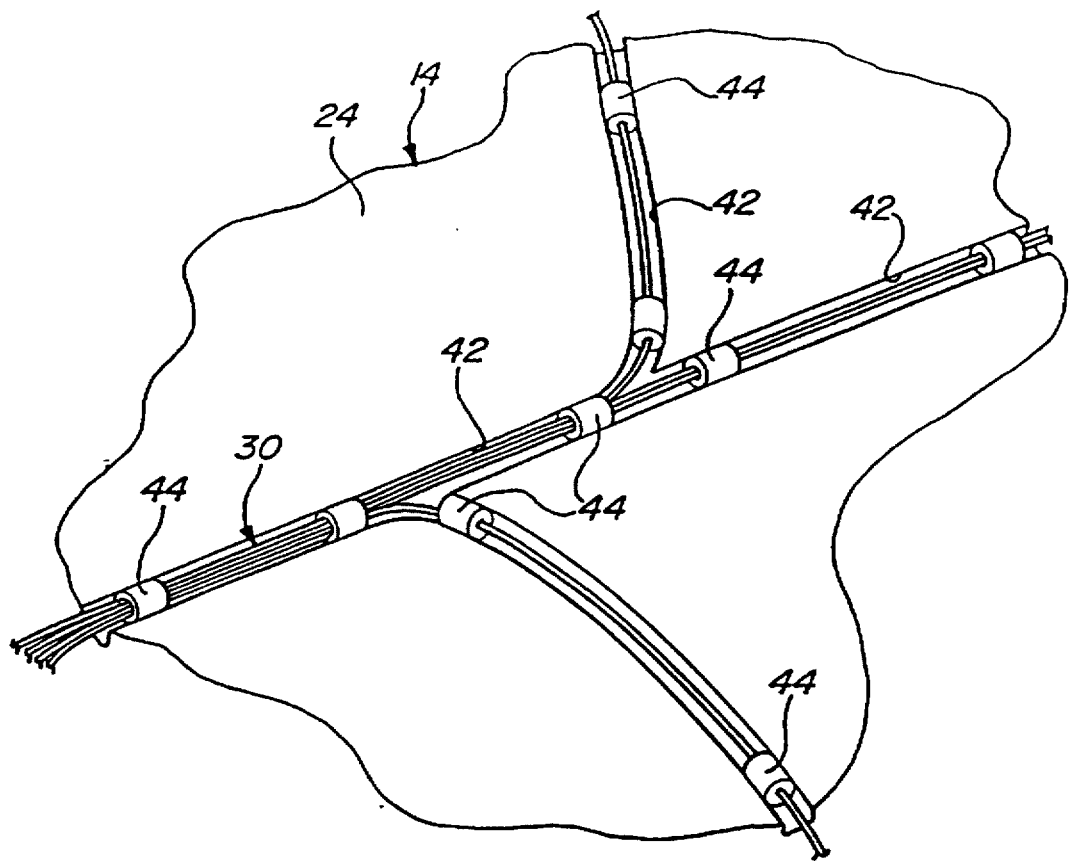
FIG. 3 is a second alternative embodiment of the routing elements according to the subject invention.

Referring to FIG. 3, a second alternative embodiment of the routing elements is shown, wherein the routing elements comprise a series of channels 42 extending between the respective origination and destination points of the several wires. To help secure the wires 30 in position, a glue 44 (or other form of adhesive, such as tape or the like) may be placed in strategic locations along the channels. A typical industrial hot-melt glue 44 will provide satisfactory results. The glue 44 may be used with any of the other embodiments of the subject invention described herein to further enhance retention of the wires 30 in their routed positions to prevent abrasion and vibration.

Figure 4:
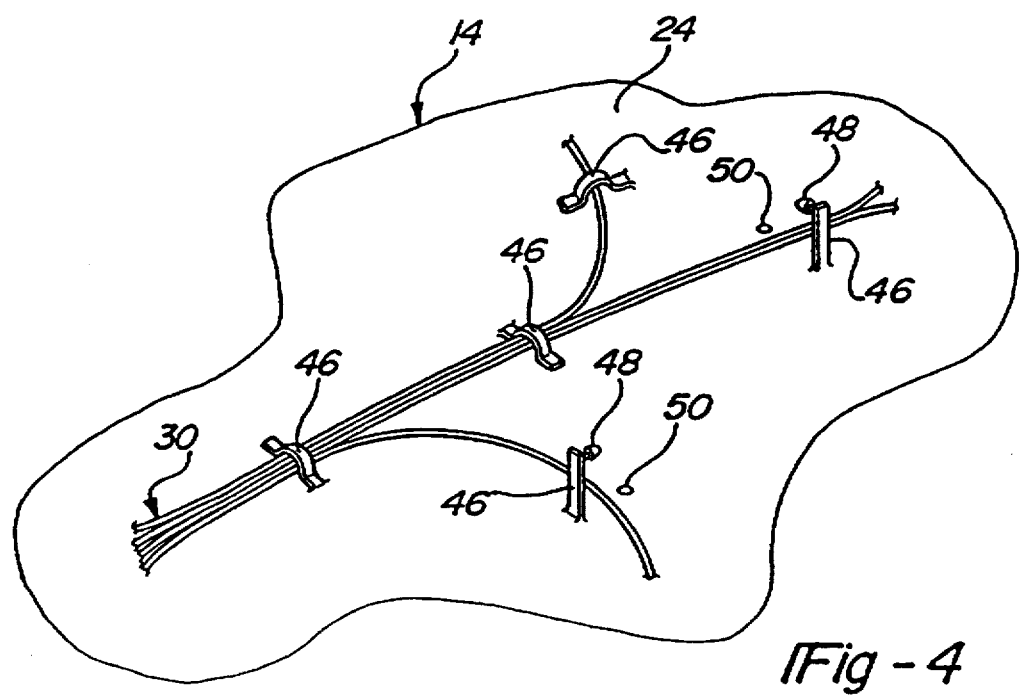
FIG. 4 is a third alternative embodiment of the routing elements according to the subject invention.

In FIG. 4, a third alternative embodiment of the routing elements is shown, wherein the routing elements include a plurality of self-locking strap-like clamps 46. The clamps 46 may either be integrally formed with the trim panel 14 or be loose piece fabricated and then assembled to the trim panel 14 in a subassembly process. As shown in FIG. 4, the clamps 46 include a barbed push fastener 48 which seats in hole 50 in the outer surface 24 of the trim panel 14.

Referring again to FIG. 1, the wires 30 are shown including electrical connectors at their respective terminal ends. The connectors allow convenient assembly and, perhaps as importantly, convenient serviceability of the related components. For example, a primary connector 52 attaches all of the origination ends of the wires for receiving electrical power from a source and transmitting signals to various electrical devices. This primary connector 52 mates with a complimentary connector (not shown) adjacent the A-pillar (or other portion of the automobile body). A window motor connector 54 couples to the window motor 18. A window switch connector 56 couples to the power window control switch (not shown). A lock switch connector 58 couples to the power lock control switch (not shown). And a solenoid connector 60 couples to the lock solenoid 22. As mentioned above, additional components, both controlling and controlled devices, may be networked with wires 30 routed in the trim panel 14.

The method for carrying out the subject invention comprises the steps of forming a structural vehicle frame, such as a door frame 12, having an inner surface 17, forming a trim panel 14 having an outer surface 24 adapted to overlie the inner surface 17 of the door frame 12, and positioning a plurality of electrical devices in the door frame 12 and the trim panel 14. The improvement comprises forming wire routing elements on the outer surface 24 of the trim panel 14 and then individually and sequentially securing a plurality of electrical wires 30 along the routing elements to the electrical devices to eliminate the need for a prefabricated wiring harness. Instructional routing indicia 40 may be displayed on the outer surface 24 of the trim panel 14 to facilitate the routing process. In a sense, the wire harness is formed on the trim panel. Finally, the outer surface 24 of the trim panel 14 is attached to the inner surface 17 of the door frame 12. In this manner, the prior art process of refabricating the wires 30 in a harness is avoided, thereby conserving time investments, as well as reducing the inventory, cataloging and shipping concerns of the prior art wiring harness assemblies.

Preferably, the step of securing the electrical wires 30 includes applying an adhesive, which may be in the form of glue 44 or an adhesive tape. Several alternative methods of securing the electrical wires 30 are disclosed, including weaving or lacing the electrical wires 30 between a series of posts 32, seating the electrical wires 30 inside the receiving notch 36 of a series of tabs 34, positioning the electrical wires 30 inside a channel 42, or clamping the electrical wires 30 to the trim panel 14 by self-locking strap-like clamps 46.

The prior art has exclusively taught that the electrical wires 30 are to be preassembled into a wiring harness. Such wiring harnesses are labor intensive to prefabricate, consuming valuable worker time and shop floor space. Also, because the prior art wiring harnesses are pre-assembled and shipped to the assembly line for installation at the time of assembly of the whole automobile, it is necessary to maintain inventory for the wiring harnesses, which requires additional time and paperwork, and introduce the potential for an error. However, the subject invention overcomes these disadvantages by eliminating the wiring harness prefabrication process entirely. Instead, the individual wires are routed directly on the outer surface 24 of the trim panel 14, such that there is no inventory, cataloging or shipment concerns apart for the trim panel 14 itself. Also, the subject method eliminates one step on the assembly line, namely the attachment of the prior art wiring harness to the door frame 12 or to the trim panel 14.

Figure 5:
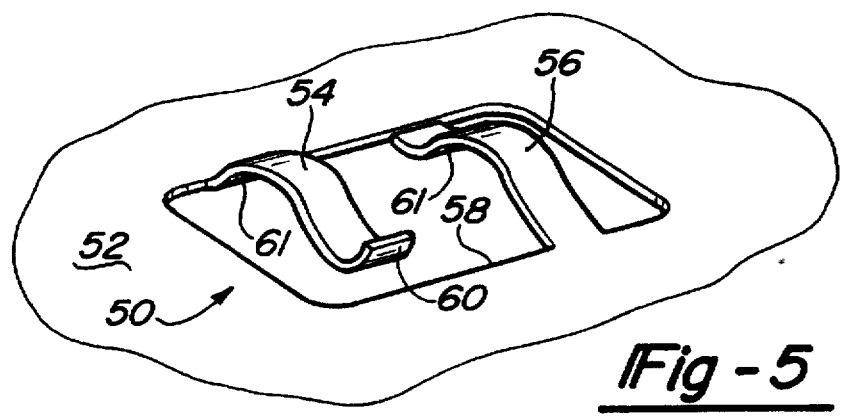
FIG. 5 shows a fourth alternative embodiment of the routing elements according to the subject invention.

FIG. 5 shows a fourth embodiment 50 including a trim panel 52 having a pair of opposed retainers 54 integrally molded with the trim panel body. The retainers extend from opposed sides of a well 58. An outer open end 60 of the retainer is spaced from the opposed edge of the well. Thus, the retainers each have an open end which extends toward the trim panel face from a central channel portion 61.

Figure 6:
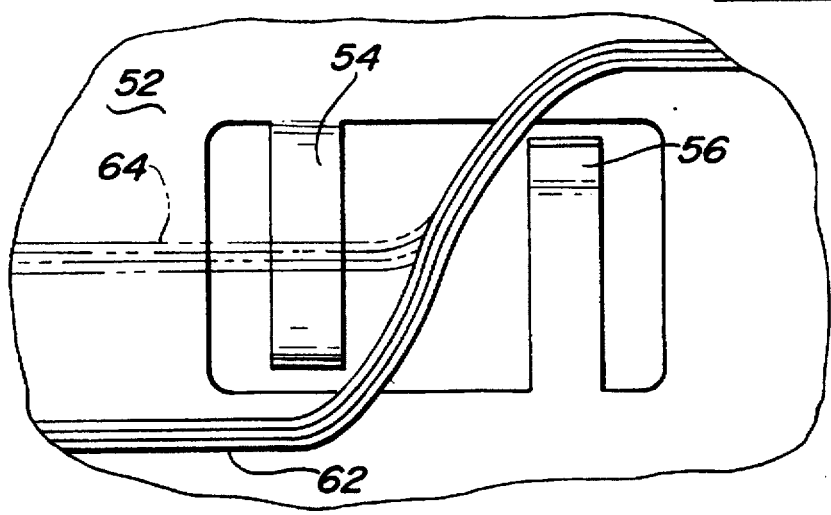
FIG. 6 is a plan view of the fourth embodiment routing elements.
Figure 7:
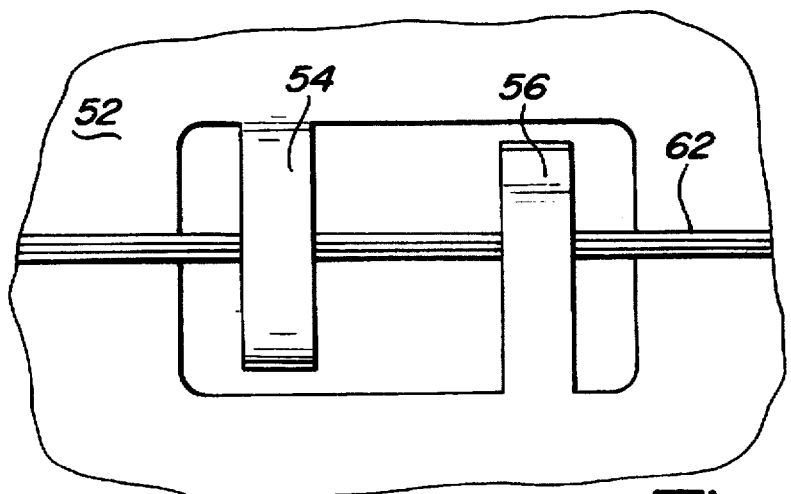
FIG. 7 shows the final connection of the wire harness to the fourth embodiment.

As shown in FIG. 6, when attaching a wire such as wire 62 to the trim panel 52, the wire is first snapped beneath one of the retainers, such as retainer 64, and into channel 61. A wire as shown in dotted line at 64 has now been snapped underneath retainer 54. The other retainer 66 then receives that wire 64, and the wire is then secured beneath both retainers as is shown in FIG. 7. The entire wire harness is assembled in this way, and the opposed retainer fingers ensure that the wire is securely held on the trim panel 52.

Those skilled in the art will appreciate that the subject invention is not limited to the routing of electrical wires 30 in an automobile door 10, but may be employed in any trim panel covering a structural member of an automobile or the like. The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A method for assembling an electrical wire covering trim panel comprising the steps of:

forming a trim panel having an outer surface adapted to overlie the inner surface of a vehicle structural member;

positioning at least one electrical device in the trim panel;

forming wire routing elements on the outer surface of the trim panel, at least one of said routing elements having a first end secured to said trim panel and a second end movable relative to said trim panel; and individually and sequentially securing a plurality of electrical wires along the routing elements to the electrical devices to eliminate the need for a prefabricated wiring harness, the step of securing said wire to said at least one routing elements including snapping the wire under said first end.

2. A method as recited in claim 1, wherein said routing elements include a pair of opposed retainers, each of said retainers having a first end secured to said trim panel and a second open end which is movable relative to said trim panel, and the step of securing the wire to said routing elements includes snapping the wire under said opposed free end of one of said retainers, and then snapping said wire under the opposed free end of the other of said retainers.

3. A method as set forth in claim 2, wherein said retainers are formed adjacent a well, and the open ends of said retainers facing in opposed directions such that one of said retainers has its secured end placed adjacent said open end of the other of said retainers.

4. A method for assembling an electrical wire covering trim panel to a structural frame of a vehicle comprising the steps of:

forming a structural frame having an inner surface;

forming a trim panel having an outer surface adapted to overlie the inner surface of the frame;

positioning a plurality of electrical devices in the frame and the trim panel;

forming a wire routing elements on the outer surface of the trim panel;

individually and sequentially securing a plurality of electrical wires along the routing elements to the electrical devices to eliminate the need for a prefabricated wiring harness;

attaching the outer surface of the trim panel to the inner surface of the frame; and said routing elements include a pair of opposed retainers, each of said retainers having a first free end secured to said trim panel and a second open end which is movable relative to said trim panel, the step of securing the wire to said routing elements includes snapping the wire under said opposed free end of one of said retainers, and then snapping said wire under the opposed free end of the other of said retainers.

5. A method as set forth in claim 4, wherein said retainers are formed adjacent a well, and the open ends of said retainers facing in opposed directions such that one of said retainers has its secured end placed adjacent said open end of the other of said retainers.

6. A method for assembly an electric wire covering trim panel comprising the steps of:

forming a trim panel having an outer surface adapted to overlie the inner surface of a vehicle structural member;

positioning at least one electrical device in the trim panel;

forming wire routing elements on the trim panel, the routing elements being formed having a first end secured to said trim panel and a second open end free movable relative to said trim panel; and individually and sequentially securing a plurality of electrical wires along the routing elements to the electrical device to element the need for fabricating a separate wire harness, wherein the step of securing the wire along the routing elements includes first snapping the wire under the open end of one of said retainer elements, and then snapping the wire under the open end of the other of said retainer elements, the open end of one of said routing elements being formed adjacent the secured end of the other of said routing elements.

* * * * *